United States Patent
Khoury et al.

(10) Patent No.: US 11,558,185 B2
(45) Date of Patent: Jan. 17, 2023

(54) STREAM-BASED KEY MANAGEMENT

(71) Applicant: Raytheon BBN Technologies Corp., Cambridge, MA (US)

(72) Inventors: Joud Khoury, Boston, MA (US); Samuel Cunningham Nelson, Sudbury, MA (US); William Timothy Strayer, West Newton, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 41 days.

(21) Appl. No.: 17/207,042

(22) Filed: Mar. 19, 2021

(65) Prior Publication Data
US 2022/0303127 A1    Sep. 22, 2022

(51) Int. Cl.
*G06F 21/00* (2013.01)
*H04L 29/06* (2006.01)
*H04L 9/08* (2006.01)
*H04L 9/06* (2006.01)
(Continued)

(52) U.S. Cl.
CPC .......... *H04L 9/0838* (2013.01); *H04L 9/0618* (2013.01); *H04L 9/0819* (2013.01); *H04L 9/14* (2013.01); *H04L 67/55* (2022.05)

(58) Field of Classification Search
None
See application file for complete search history.

(56) References Cited

U.S. PATENT DOCUMENTS

| | | |
|---|---|---|
| 10,931,651 B2 | 2/2021 | Du |
| 2002/0147906 A1 | 10/2002 | Lotspiech et al. |
| 2003/0140227 A1 | 7/2003 | Asano et al. |

(Continued)

FOREIGN PATENT DOCUMENTS

| | | |
|---|---|---|
| CN | 105592100 A | 5/2016 |
| CN | 107566386 A | 1/2018 |

(Continued)

OTHER PUBLICATIONS

ETSI Technical Committee Cyber Security (CYBER), "Attribute Based Encryption for Attribute Based Access Control," ETSI TS 103 531, 2018, V1.1.1.

(Continued)

*Primary Examiner* — Lisa C Lewis
(74) *Attorney, Agent, or Firm* — Lando & Anastasi, LLP

(57) ABSTRACT

Techniques for stream-based key management are disclosed. A system obtains a first payload to be published to a first set of one or more subscribers, encrypts the first payload using a symmetric key, to obtain a first payload ciphertext, encrypts the symmetric key using an attribute-based encryption (ABE) policy associated with the first payload, to obtain a key ciphertext, and publishes the first payload ciphertext and the key ciphertext. The system obtains a second payload to be published to a second set of one or more subscribers. Responsive at least to determining that each subscriber in the second set of one or more subscribers is in the first set of one or more subscribers and the ABE policy is associated with the second payload, the system encrypts the second payload using the symmetric key, to obtain a second payload ciphertext, and publishes the second payload ciphertext without republishing the key ciphertext.

20 Claims, 6 Drawing Sheets

(51) Int. Cl.
    *H04L 9/14*    (2006.01)
    *H04L 67/55*   (2022.01)

(56) References Cited

U.S. PATENT DOCUMENTS

| | | |
|---|---|---|
| 2008/0192939 A1 | 8/2008 | Lotspiech et al. |
| 2011/0099362 A1 | 4/2011 | Haga et al. |
| 2011/0320809 A1 | 12/2011 | Amendola et al. |
| 2016/0014095 A1 | 1/2016 | Strayer et al. |
| 2019/0297063 A1* | 9/2019 | De Gaspari ........... H04L 9/0847 |
| 2021/0135864 A1 | 5/2021 | Salmela et al. |
| 2022/0052835 A1 | 2/2022 | Eldefrawy et al. |

FOREIGN PATENT DOCUMENTS

| | | |
|---|---|---|
| CN | 108989026 A | 12/2018 |
| WO | 2010024931 A1 | 3/2010 |
| WO | 2013131244 A1 | 9/2013 |
| WO | 2014028039 A1 | 2/2014 |
| WO | 2014059622 A1 | 4/2014 |
| WO | 2016014079 A1 | 1/2016 |

OTHER PUBLICATIONS

ETSI Technical Committee Cyber Security (CYBER), "Application of Attribute Based Encryption (ABE) for PII and personal data protection on IoT devices, WLAN, cloud and mobile services—High level requirements," ETSI TS 103 458, 2018, V1.1.1.

Kumar, S., et al., "JEDI: Many-to-Many End-to-End Encryption and Key Delegation for IoT," Proceedings of the 28th USENIX Security Symposium, 2019, pp. 1519-1536.

Naor, D., et al., "Revocation and Tracing Schemes for Stateless Receivers," 2001, pp. 1-34.

\* cited by examiner

STREAM-BASED KEY MANAGEMENT

STATEMENT REGARDING FEDERALLY-SPONSORED RESEARCH OR DEVELOPMENT

This application was made with government support. The U.S. Government has certain rights in this invention.

BACKGROUND

Ciphertext expansion refers to the size increase (e.g., measured in bytes) of a payload when it is encrypted. The additional size is attributable to the inclusion of information needed to decrypt the payload. For example, attribute-based encryption (ABE) is sometimes used in publish-subscribe systems where the publisher does not know the set of subscribers ahead of time. In such systems, every packet must be encrypted using a secret key, which must itself be encrypted and transmitted along with the payload ciphertext. Other kinds of encryption include other kinds of ciphertext expansion.

Table 1 shows examples of ciphertext expansion when using a typical ABE approach, for different policy sizes (i.e., different numbers of leaf attributes). In Table 1, expansion is measured in bytes. Two sets of examples are provided:

Cyphertext Policy ABE (CP-ABE) as described in Brent Waters, Ciphertext-Policy Attribute-Based Encryption: An Expressive, Efficient, and Provably Secure Realization, Eprint 2008 (CPABEw08); and Multi-Authority CP-ABE as described in Yannis Rouselakis and Brent Waters. Efficient statically-secure large-universe multi-authority attribute-based encryption. In Rainer Böhme and Tatsuaki Okamoto, editors, *Financial Cryptography and Data Security—FC* 2015, volume 8975 of Lecture Notes in Computer Science, pages 315-332. Springer, 2015. (MA-CPABErw15).

TABLE 1

| Ciphertext and signature expansion, 112 bits of security | | | | | | |
|---|---|---|---|---|---|---|
| Policy size: | 1 | 5 | 10 | 20 | 50 | 100 |
| CPABEw08 | 323 | 1099 | 2069 | 4009 | 9829 | 19529 |
| MA-CPABErw15 | 643 | 3215 | 6430 | 12860 | 32150 | 64300 |

The examples illustrated in Table 1 show that using a typical ABE approach, ABE ciphertext expansion scales linearly with policy size/complexity, and super-linearly with security level.

The costs of ciphertext expansion can be significant, in terms of network bandwidth utilized, processing needed to encrypt each packet, and/or processing needed to decrypt each packet. In a situation where very limited bandwidth and/or processing capacity is available, ciphertext expansion may be prohibitively expensive.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to encryption key management.

SUMMARY

In general, in one aspect, one or more non-transitory machine-readable media store instructions that, when executed by one or more processors, cause the one or more processors to perform operations including: obtaining a first payload to be published to a first set of one or more subscribers; encrypting the first payload using a first symmetric key, to obtain a first payload ciphertext; encrypting the first symmetric key using a first attribute-based encryption (ABE) policy associated with the first payload, to obtain a first key ciphertext; publishing the first payload ciphertext and the first key ciphertext to the first set of one or more subscribers; obtaining a second payload to be published to a second set of one or more subscribers; determining that each subscriber in the second set of one more subscribers is in the first set of one or more subscribers; determining that the first ABE policy is associated with the second payload; and responsive at least to determining that each subscriber in the second set of one more subscribers is in the first set of one or more subscribers and the first ABE policy is associated with the second payload, (a) encrypting the second payload using the first symmetric key, to obtain a second payload ciphertext, and (b) publishing the second payload ciphertext to the second set of one or more subscribers, without republishing the first key ciphertext to the second set of one or more subscribers. The first set of one or more subscribers may have at least one subscriber that is not in the second set of one or more subscribers.

The operations may further include: receiving one or more acknowledgements that each subscriber in the first set of one or more subscribers received the first key ciphertext, publishing the second payload ciphertext to the second set of one or more subscribers, without republishing the first key ciphertext to the second set of one or more subscribers, being further responsive to receiving the one or more acknowledgements that each subscriber in the first set of one or more subscribers received the first key ciphertext.

The operations may further include: obtaining a third payload to be published to a third set of one or more subscribers: determining that a second ABE policy associated with the third payload is different from the first ABE policy; and responsive at least to determining that the second ABE policy associated with the third payload is different from the first ABE policy, (a) encrypting the third payload using a second symmetric key that is different from the first symmetric key, to obtain a third payload ciphertext, (b) encrypting the second symmetric key using the second ABE policy, to obtain a second key ciphertext, and (c) publishing the third payload ciphertext and the second key ciphertext to the third set of one or more subscribers.

The operations may further include: obtaining a third payload to be published to a third set of one or more subscribers; determining that at least one subscriber in the third set of one more subscribers is not in the first set of one or more subscribers; and responsive at least to determining that at least one subscriber in the third set of one more subscribers is not in the first set of one or more subscribers, (a) encrypting the third payload using a second symmetric key that is different from the first symmetric key, to obtain a third payload ciphertext, (b) encrypting the second symmetric key, to obtain a second key ciphertext, and (c) publishing the third payload ciphertext and the second key ciphertext to the third set of one or more subscribers.

The operations may further include: after publishing the third payload ciphertext and the second key ciphertext to the third set of one or more subscribers, obtaining a fourth payload to be published to a fourth set of one or more subscribers; determining that each subscriber in the fourth set of one more subscribers is in the first set of one or more subscribers; determining that the first ABE policy is associated with the fourth payload; responsive at least to determining that each subscriber in the fourth set of one more subscribers is in the first set of one or more subscribers and the first ABE policy is associated with the fourth payload, (a) encrypting the fourth payload using the first symmetric key, to obtain a fourth payload ciphertext, (b) publishing the fourth payload ciphertext to the fourth set of one or more subscribers, without republishing the first key ciphertext to the fourth set of one or more subscribers; after publishing the fourth payload ciphertext to the fourth set of one or more subscribers, obtaining a fifth payload to be published to a fifth set of one or more subscribers; determining that each subscriber in the fifth set of one more subscribers is in the third set of one or more subscribers; determining that a same ABE policy is associated with the fifth payload and the third payload; responsive at least to determining that each subscriber in the fifth set of one more subscribers is in the third set of one or more subscribers and a same ABE policy is associated with the fifth payload and the third payload, (a) encrypting the fifth payload using the second symmetric key, to obtain a fifth payload ciphertext, (b) publishing the fifth payload ciphertext to the fifth set of one or more subscribers, without republishing the second key ciphertext to the fifth set of one or more subscribers.

The operations may further include: obtaining a third payload to be published to a third set of one or more subscribers; determining that the first symmetric key is no longer valid, based at least on a key expiration policy; and responsive at least to determining that the first symmetric key is no longer valid, (a) encrypting the third payload using a second symmetric key that is different from the first symmetric key, to obtain a third payload ciphertext, (b) encrypting the second symmetric key, to obtain a second key ciphertext, and (c) publishing the third payload ciphertext and the second key ciphertext to the third set of one or more subscribers.

In general, in one aspect, a system includes at least one device including a hardware processor, the system being configured to perform operations including: obtaining a first payload to be published to a first set of one or more subscribers; encrypting the first payload using a first symmetric key, to obtain a first payload ciphertext; encrypting the first symmetric key using a first attribute-based encryption (ABE) policy associated with the first payload, to obtain a first key ciphertext; publishing the first payload ciphertext and the first key ciphertext to the first set of one or more subscribers; obtaining a second payload to be published to a second set of one or more subscribers; determining that each subscriber in the second set of one more subscribers is in the first set of one or more subscribers; determining that the first ABE policy is associated with the second payload; and responsive at least to determining that each subscriber in the second set of one more subscribers is in the first set of one or more subscribers and the first ABE policy is associated with the second payload, (a) encrypting the second payload using the first symmetric key, to obtain a second payload ciphertext, (b) publishing the second payload ciphertext to the second set of one or more subscribers, without republishing the first key ciphertext to the second set of one or more subscribers. The first set of one or more subscribers may have at least one subscriber that is not in the second set of one or more subscribers.

The operations may further include: receiving one or more acknowledgements that each subscriber in the first set of one or more subscribers received the first key ciphertext, publishing the second payload ciphertext to the second set of one or more subscribers, without republishing the first key ciphertext to the second set of one or more subscribers, being further responsive to receiving the one or more acknowledgements that each subscriber in the first set of one or more subscribers received the first key ciphertext.

The operations may further include: obtaining a third payload to be published to a third set of one or more subscribers: determining that a second ABE policy associated with the third payload is different from the first ABE policy; and responsive at least to determining that the second ABE policy associated with the third payload is different from the first ABE policy, (a) encrypting the third payload using a second symmetric key that is different from the first symmetric key, to obtain a third payload ciphertext, (b) encrypting the second symmetric key using the second ABE policy, to obtain a second key ciphertext, and (c) publishing the third payload ciphertext and the second key ciphertext to the third set of one or more subscribers.

The operations may further include: obtaining a third payload to be published to a third set of one or more subscribers; determining that at least one subscriber in the third set of one more subscribers is not in the first set of one or more subscribers; and responsive at least to determining that at least one subscriber in the third set of one more subscribers is not in the first set of one or more subscribers, (a) encrypting the third payload using a second symmetric key that is different from the first symmetric key, to obtain a third payload ciphertext, (b) encrypting the second symmetric key, to obtain a second key ciphertext, and (c) publishing the third payload ciphertext and the second key ciphertext to the third set of one or more subscribers.

The operations may further include: after publishing the third payload ciphertext and the second key ciphertext to the third set of one or more subscribers, obtaining a fourth payload to be published to a fourth set of one or more subscribers; determining that each subscriber in the fourth set of one more subscribers is in the first set of one or more subscribers; determining that the first ABE policy is associated with the fourth payload; responsive at least to determining that each subscriber in the fourth set of one more subscribers is in the first set of one or more subscribers and the first ABE policy is associated with the fourth payload, (a) encrypting the fourth payload using the first symmetric key, to obtain a fourth payload ciphertext, (b) publishing the fourth payload ciphertext to the fourth set of one or more subscribers, without republishing the first key ciphertext to the fourth set of one or more subscribers; after publishing the fourth payload ciphertext to the fourth set of one or more subscribers, obtaining a fifth payload to be published to a fifth set of one or more subscribers; determining that each subscriber in the fifth set of one more subscribers is in the third set of one or more subscribers; determining that a same ABE policy is associated with the fifth payload and the third payload; responsive at least to determining that each subscriber in the fifth set of one more subscribers is in the third set of one or more subscribers and a same ABE policy is associated with the fifth payload and the third payload, (a) encrypting the fifth payload using the second symmetric key, to obtain a fifth payload ciphertext, (b) publishing the fifth payload ciphertext to the fifth set of one or more subscribers, without republishing the second key ciphertext to the fifth set of one or more subscribers.

The operations may further include: obtaining a third payload to be published to a third set of one or more subscribers; determining that the first symmetric key is no longer valid, based at least on a key expiration policy; and responsive at least to determining that the first symmetric key is no longer valid, (a) encrypting the third payload using a second symmetric key that is different from the first symmetric key, to obtain a third payload ciphertext, (b) encrypting the second symmetric key, to obtain a second key ciphertext, and (c) publishing the third payload ciphertext and the second key ciphertext to the third set of one or more subscribers.

In general, in one aspect, a method includes: obtaining a first payload to be published to a first set of one or more subscribers; encrypting the first payload using a first symmetric key, to obtain a first payload ciphertext; encrypting the first symmetric key using a first attribute-based encryption (ABE) policy associated with the first payload, to obtain a first key ciphertext; publishing the first payload ciphertext and the first key ciphertext to the first set of one or more subscribers; obtaining a second payload to be published to a second set of one or more subscribers; determining that each subscriber in the second set of one more subscribers is in the first set of one or more subscribers; determining that the first ABE policy is associated with the second payload; and responsive at least to determining that each subscriber in the second set of one more subscribers is in the first set of one or more subscribers and the first ABE policy is associated with the second payload, (a) encrypting the second payload using the first symmetric key, to obtain a second payload ciphertext, (b) publishing the second payload ciphertext to the second set of one or more subscribers, without republishing the first key ciphertext to the second set of one or more subscribers. The first set of one or more subscribers may have at least one subscriber that is not in the second set of one or more subscribers.

The method may further include: receiving one or more acknowledgements that each subscriber in the first set of one or more subscribers received the first key ciphertext, publishing the second payload ciphertext to the second set of one or more subscribers, without republishing the first key ciphertext to the second set of one or more subscribers, being further responsive to receiving the one or more acknowledgements that each subscriber in the first set of one or more subscribers received the first key ciphertext.

The method may further include: obtaining a third payload to be published to a third set of one or more subscribers: determining that a second ABE policy associated with the third payload is different from the first ABE policy; and responsive at least to determining that the second ABE policy associated with the third payload is different from the first ABE policy, (a) encrypting the third payload using a second symmetric key that is different from the first symmetric key, to obtain a third payload ciphertext, (b) encrypting the second symmetric key using the second ABE policy, to obtain a second key ciphertext, and (c) publishing the third payload ciphertext and the second key ciphertext to the third set of one or more subscribers.

The method may further include: obtaining a third payload to be published to a third set of one or more subscribers; determining that at least one subscriber in the third set of one more subscribers is not in the first set of one or more subscribers; and responsive at least to determining that at least one subscriber in the third set of one more subscribers is not in the first set of one or more subscribers, (a) encrypting the third payload using a second symmetric key that is different from the first symmetric key, to obtain a third payload ciphertext, (b) encrypting the second symmetric key, to obtain a second key ciphertext, and (c) publishing the third payload ciphertext and the second key ciphertext to the third set of one or more subscribers.

The method may further include: after publishing the third payload ciphertext and the second key ciphertext to the third set of one or more subscribers, obtaining a fourth payload to be published to a fourth set of one or more subscribers; determining that each subscriber in the fourth set of one more subscribers is in the first set of one or more subscribers; determining that the first ABE policy is associated with the fourth payload; responsive at least to determining that each subscriber in the fourth set of one more subscribers is in the first set of one or more subscribers and the first ABE policy is associated with the fourth payload, (a) encrypting the fourth payload using the first symmetric key, to obtain a fourth payload ciphertext, (b) publishing the fourth payload ciphertext to the fourth set of one or more subscribers, without republishing the first key ciphertext to the fourth set of one or more subscribers; after publishing the fourth payload ciphertext to the fourth set of one or more subscribers, obtaining a fifth payload to be published to a fifth set of one or more subscribers; determining that each subscriber in the fifth set of one more subscribers is in the third set of one or more subscribers; determining that a same ABE policy is associated with the fifth payload and the third payload; responsive at least to determining that each subscriber in the fifth set of one more subscribers is in the third set of one or more subscribers and a same ABE policy is associated with the fifth payload and the third payload, (a) encrypting the fifth payload using the second symmetric key, to obtain a fifth payload ciphertext, (b) publishing the fifth payload ciphertext to the fifth set of one or more subscribers, without republishing the second key ciphertext to the fifth set of one or more subscribers.

The method may further include: obtaining a third payload to be published to a third set of one or more subscribers; determining that the first symmetric key is no longer valid, based at least on a key expiration policy; and responsive at least to determining that the first symmetric key is no longer valid, (a) encrypting the third payload using a second symmetric key that is different from the first symmetric key, to obtain a third payload ciphertext, (b) encrypting the second symmetric key, to obtain a second key ciphertext, and (c) publishing the third payload ciphertext and the second key ciphertext to the third set of one or more subscribers.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

I. System Architecture

Figure 1:
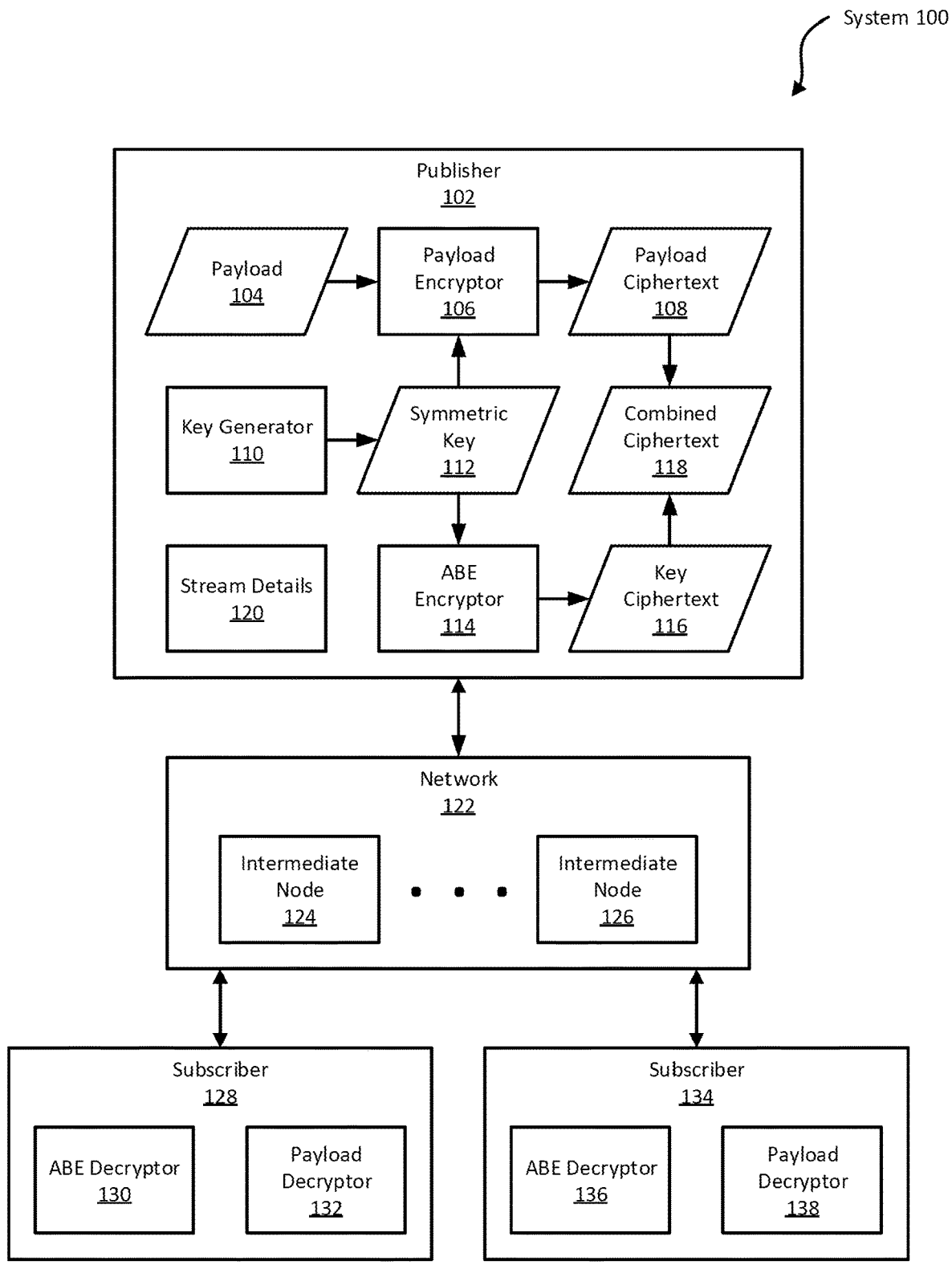
FIG. 1 is a block diagram of an example of a system according to an embodiment.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, a publisher 102 is configured to publish data to one or more subscribers over a network 122 (e.g., via one or more intermediate nodes 124, 126). In this example, there are two subscribers: subscriber 128 and subscriber 134. Specifically, the publisher 102 is configured to obtain a payload 104. In the examples described herein, the payload 104 is assumed to be a single packet. Alternatively or additionally, techniques described herein may be applied to different units of payload. The publisher 102 may obtain the payload 104 from a sensor (e.g., an image sensor, video sensor, global positioning system (GPS), and/or another kind of sensor) or from another source. The publisher 102 may generate the payload 104 itself or obtain the payload 104 from another node (not shown).

The publisher 102 includes a key generator 110 configured to generate symmetric keys (e.g., symmetric key 112). The publisher 102 includes a payload encryptor 106 configured to encrypt the payload 104 using a symmetric key 112. Encrypting the payload 104 generates a payload ciphertext 108. The publisher 102 further includes an ABE encryptor 114 configured to encrypt the symmetric key 112 using ABE. Encrypting the symmetric key 112 generates a key ciphertext 116. The publisher 102 may be configured to combine the payload ciphertext 108 and key ciphertext 116 into a combined ciphertext 118, to be published to the target subscriber(s). Alternatively, the publisher 102 may be configured to publish the payload ciphertext 108 and key ciphertext 116 separately. As described below, when using stream-based key management, the publisher 102 may be configured to transmit a payload ciphertext 108 without including a key ciphertext 116 that has already been published for a particular stream.

As illustrated in FIG. 1, each subscriber includes an ABE decryptor (e.g., ABE decryptors 130, 136) configured to decrypt a key ciphertext 116, to obtain the symmetric key 112. Each subscriber further includes a payload decryptor (e.g., payload decryptors 132, 138) configured to decrypt the payload ciphertext 108 using the symmetric key 114, to obtain the payload 104. When using stream-based key management as described herein, a subscriber can reuse the same symmetric key 112 to decrypt each payload in the same stream.

In an embodiment, the publisher 102 and subscribers 128, 134 are parts of a publish-subscribe system where the publisher 102 knows which specific subscriber(s) is/are to receive the payload 104. At a high level, a publish-subscribe network may be classified as enterprise or tactical, and may be centralized or distributed. Examples of enterprise centralized publish-subscribe networks include, but are not limited to: Apache ActiveMQ®, MQTT for the Internet of Things (IoT), and general enterprise service buses. Examples of tactical decentralized publish-subscribe networks include, but are not limited to: Dynamo/Robust Information Provisioning Layer (RIPL) (developed by Raytheon BBN Technologies Corp.) and Named Data Networking (NDN). In addition, the publisher 102 may use ABE to help ensure that only the targeted subscriber(s) can decrypt the symmetric key 112. Knowledge of the specific target subscriber(s) further allows the publisher 102 to reduce ciphertext expansion using stream-based key management for specific subscribers, as described herein.

In an embodiment, even if the publisher 102 lacks knowledge of specific target subscribers, the concept of a "stream" as described herein may be extended to content encrypted using the same policy and matching the same set of subscriptions (e.g., having the same metadata) within some time window. For example, in a topic-based publish-subscribe network (e.g., ActiveMQ), content published on the same topic and encrypted with the same policy within a particular time window may belong to the same stream.

In general, as used herein, the term "stream" refers to a logical association of one or more subscribers with a particular symmetric key 112 and a particular ABE policy (not shown), from the perspective of a particular publisher 102. A stream may also be time-limited, based on an expiration policy as described herein. The publisher 102 may be configured to store information associated with a stream in one or more data repositories 120. For example, the publisher 102 may be configured to store one or more stream identifiers (e.g., alphanumerical identifiers uniquely associated with respective streams). In association with each stream identifier, the publisher may be configured to store a corresponding symmetric key, subscriber list, ABE policy, key expiration policy, and/or other information associated with that stream.

In an embodiment, a data repository 120 is any type of storage unit and/or device (e.g., a file system, database, collection of tables, or any other storage mechanism) for storing data, e.g., information associated with one or more streams as described above. A data repository 120 may include multiple different storage units and/or devices. The multiple different storage units and/or devices may or may not be of the same type or located at the same physical site. Further, a data repository 120 may be implemented or may execute on the same computing system as one or more other components of the system 100. Alternatively or additionally, a data repository 120 may be implemented or executed on a computing system separate from one or more other components of the system 100. A data repository 120 may be logically integrated with one or more other components of the system 100. Alternatively or additionally, a data repository 120 may be communicatively coupled to one or more other components of the system 100 via a direct connection or via a network.

In some examples, one or more intermediate nodes in the network 122 (e.g., intermediate nodes 124, 126) may include a caching mechanism. For example, in content-based networks, caching may be used to reduce latency when the same data is being transmitted to multiple recipients. However, caching may result in a subscriber receiving payloads (e.g., packets) in a different order than they were sent. The publisher 102 may publish a stream of packets in a particular order {P1, P2} and a subscriber 128 may receive the packets in a different order {P2, P1}. Reordering may also occur if packets are routed through different nodes to the same destination. One or more embodiments include techniques to address packet reordering and ensure that each payload is associated with the appropriate key ciphertext. In a centralized publish-subscribe system, a broker may handle packet reordering. However, in a distributed publish-subscribe system (e.g., a tactical publish-subscribe system), a broker may not be available to perform packet reordering. To avoid packets arriving out of order, content from the same publisher and belonging to the same stream may be forced to use the same path, thus ensuring that the packets arrive in the sent order. In this approach, all nodes along the path can safely cache the content. In general, to address packet reordering, an intermediate caching node may choose not to cache stream content unless it has received the ABE-encrypted ciphertext for the stream from the publisher.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

II. Operations for Stream-Based Key Management

Figure 2A:
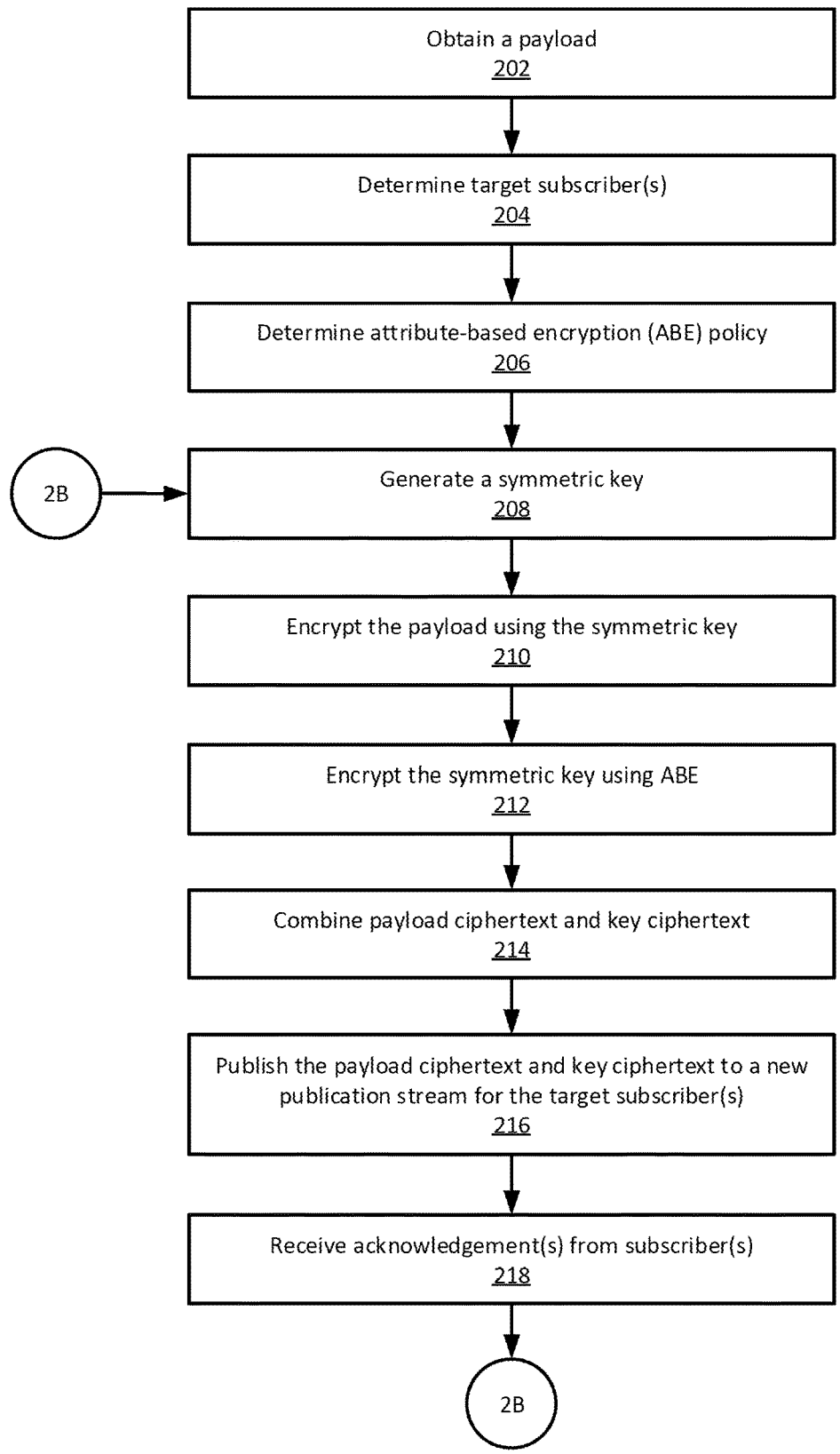
FIGS. 2A-2C are a flow diagram of an example of operations for stream-based key management according to an embodiment.
Figure 2B:
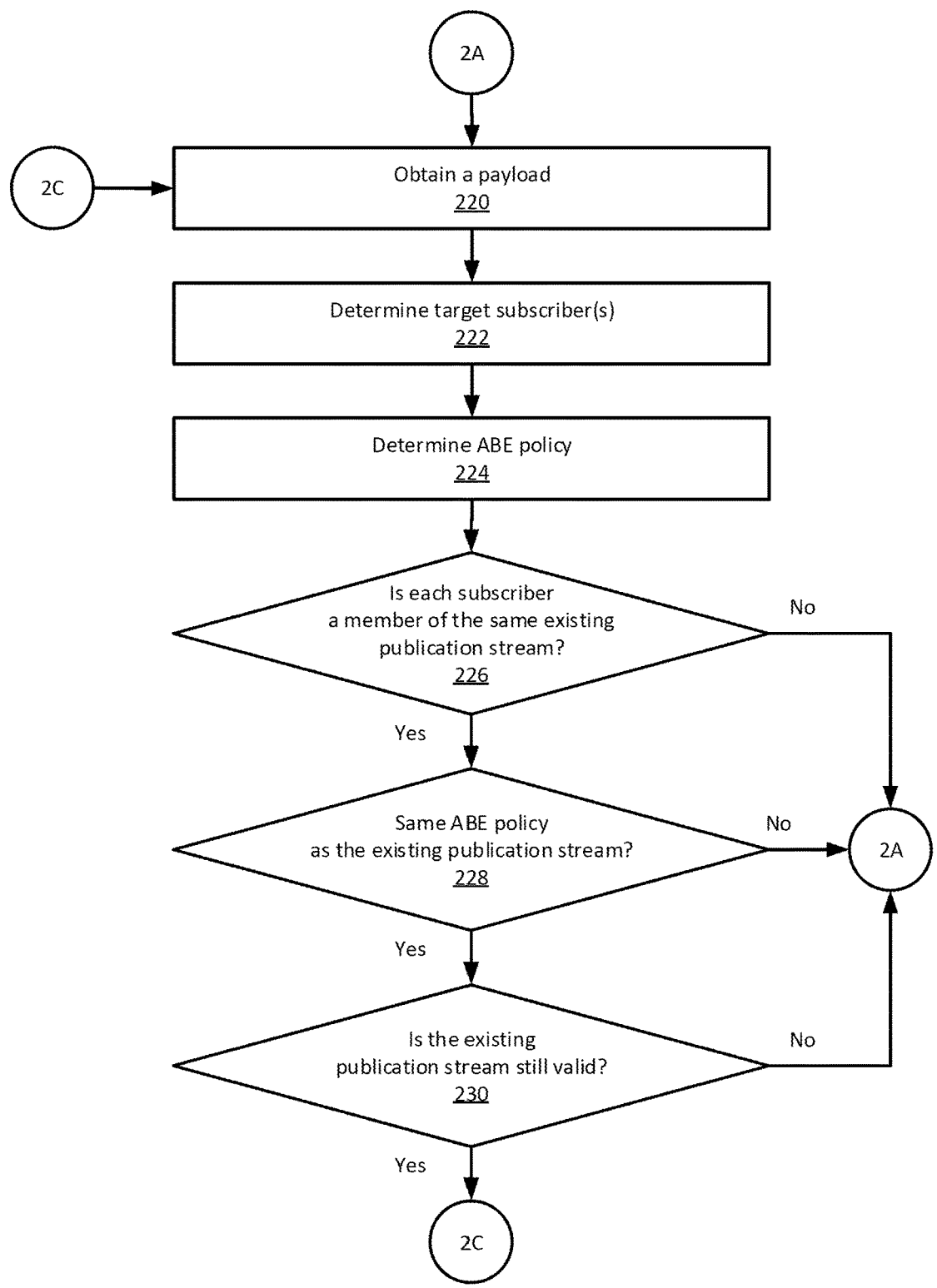
Figure 2C:
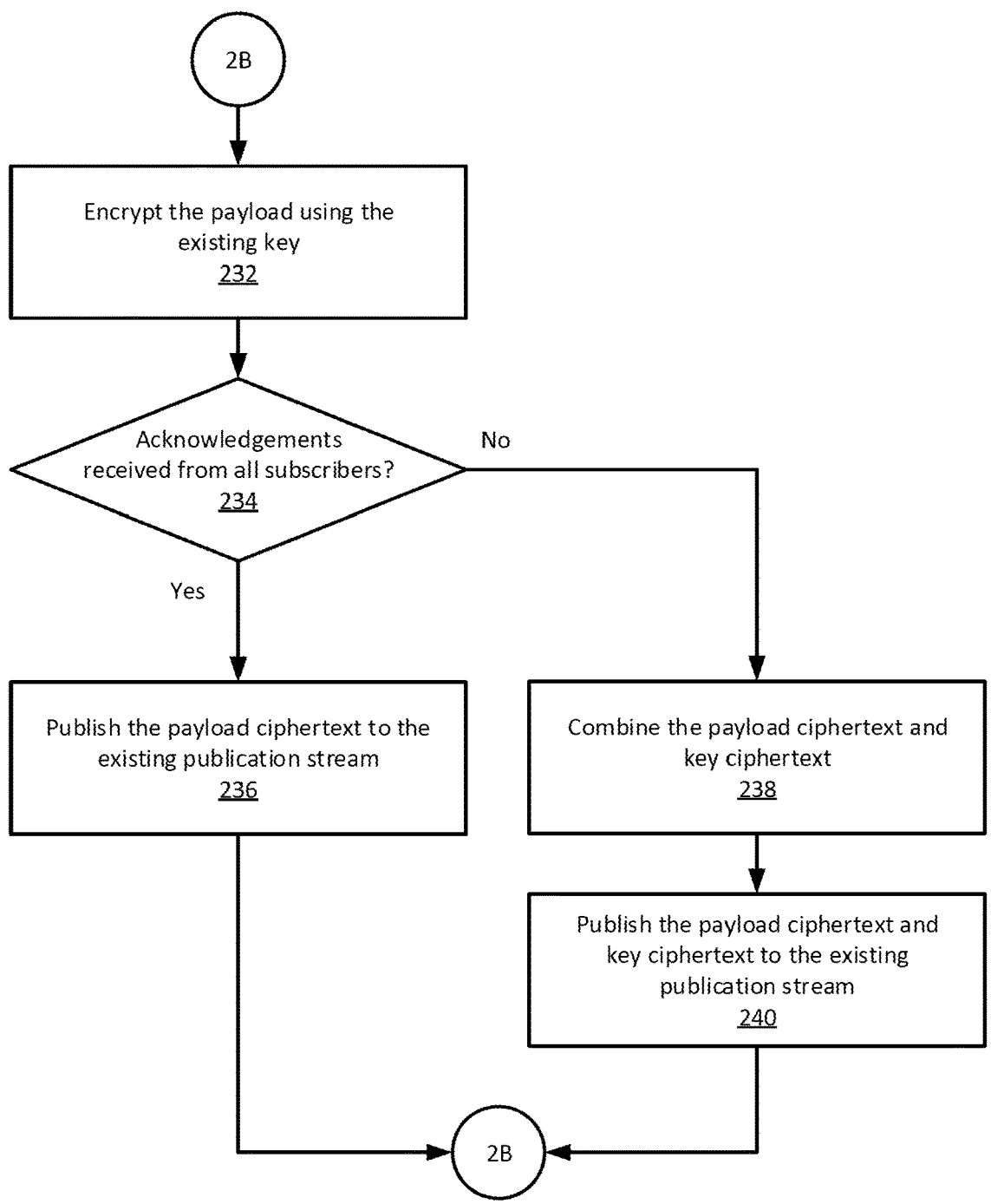

FIGS. 2A-2C are a flow diagram of an example of operations for stream-based key management according to an embodiment. One or more operations illustrated in FIGS. 2A-2C may be modified, rearranged, or omitted all together. Accordingly, the particular sequence of operations illustrated in FIGS. 2A-2C should not be construed as limiting the scope of one or more embodiments.

In the following example, unless otherwise stated, operations are performed by a publisher in a publish-subscribe interface (e.g., as illustrated in FIG. 1) in which the publisher knows which specific subscriber(s) is/are to receive a given payload. In other examples, one or more operation may be performed by another component. For example, the publisher may offload one or more key management operations to a separate device.

In an embodiment, the publisher obtains a payload (Operation 202). The publisher may obtain the payload from a sensor (e.g., an image sensor, video sensor, global positioning system (GPS), and/or another kind of sensor) or from another source. The publisher may generate the payload itself or obtain the payload from another node.

The publisher determines which target subscriber(s) is/are to receive the payload (Operation 204). The publisher further determines an ABE policy associated with the payload (Operation 206). The ABE policy indicates which attribute(s) a subscriber must possess to be able to decrypt the payload.

The publisher generates a symmetric key (Operation 208) and uses the symmetric key to encrypt the payload (Operation 210), to obtain a payload ciphertext. The publisher also encrypts the symmetric key, using ABE (Operation 212), to obtain a key ciphertext. Specifically, the publisher encrypts the symmetric key according to the ABE policy associated with the payload, so that only a subscriber possessing the required attribute(s) can decrypt the symmetric key. The publisher may combine the payload ciphertext and key ciphertext to be published together (Operation 214).

The publisher publishes the payload ciphertext and key ciphertext to a new publication stream for the target subscriber(s) (Operation 216). As discussed above, the term "stream" refers to a logical association of one or more subscribers with a particular symmetric key and a particular ABE policy (not shown). Accordingly, publishing to a particular stream refers to publishing the payload to the target subscriber(s), where the payload is protected by virtue of the symmetric key having been encrypted using the appropriate ABE policy. As discussed above, the publisher may assign a unique identifier to each stream. The publisher may publish the payload ciphertext and key ciphertext together (i.e., if the ciphertexts were combined as described above). Alternatively, the publisher may publish the payload ciphertext and key ciphertext separately.

After publishing the payload ciphertext and key ciphertext, the publisher may receive one more acknowledgements from one or more subscribers (Operation 218). An acknowledgement confirms that the subscriber has received at least the key ciphertext. As discussed below, the publisher may use receipt (or absence of receipt) of one or more acknowledgements to determine whether to republish the key ciphertext to a given stream. In a network that provides reliable transport between nodes (e.g., over one or more secure, trusted routes with strong uptime guarantees), acknowledgements may not be required to know with reasonable certainty that publication of the key ciphertext was successful, i.e., that the key ciphertext reached all the intended subscribers. In a network that does not provide reliable transport (e.g., at the tactical edge in a military environment, and/or in other environments without reliable transport), acknowledgements may be required to ensure that publication of the key ciphertext was successful.

At some later time, the publisher obtains another payload (Operation 220). The publisher determines which target subscriber(s) is/are to receive the payload (Operation 222). The publisher further determines an ABE policy associated with the payload (Operation 224).

In an embodiment, to publish the new payload to an existing stream, each of the target subscriber(s) must already be a member of the same existing stream. The publisher determines whether each of the target subscriber(s) for the new payload is a member of an existing publication stream (Operation 226). To reuse the same stream, it is not necessary for the target subscriber(s) to include all the subscribers associated with the stream, but none of the target subscriber(s) can be a subscriber that is not already associated with the stream. If even one of the target subscriber(s) is not already a member of the same existing publication stream, then a new stream is needed for this set of subscribers to receive the new payload. Accordingly, the publisher proceeds to publish the new payload to a new stream, including generating a new symmetric key for the new stream (Operation 208).

In an embodiment, to publish the new payload to an existing stream, the ABE policy associated with the new payload must also be the same as the ABE policy associated with the existing stream. The publisher determines whether the ABE policy is the same (Operation 228). If the ABE policy is not the same, then a new stream is needed for this set of subscribers to receive the new payload. Accordingly, the publisher proceeds to publish the new payload to a new stream, including generating a new symmetric key for the new stream (Operation 208).

In an embodiment, to publish the new payload to an existing stream, the existing stream must still be valid. Even if each of the target subscriber(s) is already a member of the same stream, and even if the ABE policy is the same, the stream may no longer be valid based on one or more expiration policies. For example, a stream may be valid only for a certain amount of time, a certain number of transmissions, and/or according to some other expiration policy. The publisher determines whether the existing publication stream is still valid (Operation 230). If the existing stream is no longer valid, then a new stream is needed for this set of subscribers to receive the new payload. Accordingly, the publisher proceeds to publish the new payload to a new stream, including generating a new symmetric key for the new stream (Operation 208).

If all the conditions for publishing to an existing stream are satisfied (e.g., the target subscriber(s) is/are already members of the stream, the ABE policy is the same, and the stream is still valid according to one or more expiration policies), the publisher can proceed to publish the new payload to the same publication stream. The publisher encrypts the payload using the existing key associated with the existing publication stream (Operation 232), to obtain another payload ciphertext.

As noted above, ciphertext expansion can be very costly. To mitigate against some of those costs, the publisher may refrain from republishing the key ciphertext to an existing stream, when doing so is unnecessary. Specifically, the publisher can refrain from republishing the key ciphertext if there is a reasonable certainty that each of the target subscriber(s) has already received the key ciphertext. The publisher may determine whether it has received an acknowledgement from each of the target subscriber(s) (Operation 234). If the publisher has not received an acknowledgement from each of the target subscriber(s), then the publisher may publish both the payload ciphertext and the key ciphertext to the existing publication stream (Operation 240). As above, the publisher may first combine the payload ciphertext and key ciphertext (Operation 238), or may publish them separately.

If the publisher has received an acknowledgement from each of the target subscriber(s), or otherwise determines that there is a reasonable likelihood that the target subscriber(s) already received the key ciphertext, then it is not necessary to republish the key ciphertext. The publisher proceeds to publish the payload ciphertext to the existing publication stream (Operation 236) while refraining from republishing the key ciphertext. Thus, using stream-based key management, the publisher helps mitigate against the costs of ciphertext expansion that would otherwise be incurred by sending the key ciphertext each time.

The process described above may be repeated for any number of payloads. The publisher may perform stream-based key management for any number of streams. Specifically, the publisher may configure new streams when required (e.g., based on one or more criteria as described above), thus allowing for stream-based key management over multiple sets of subscribers. The costs of ciphertext expansion may thus be significantly reduced for each stream, until an expiration condition is satisfied and a new stream is needed. In some situations, if the publisher receives acknowledgement(s) of the key ciphertext quickly enough, the publisher may only need to send the key ciphertext once for a given stream, and all subsequent publications to that same stream can avoid the costs of ciphertext expansion associated with publishing the key.

Table 2 illustrates an example of performance improvements using stream-based key management as described herein. Specifically, Table 2 compares results when a total payload of 163 megabytes (MB) is transmitted using no security, ABE without stream-based key management, and ABE with stream-based key management.

TABLE 2

Example Performance Comparison; 10-Node Simulation Scenario

|  | Total Data (MB) | Overhead (MB) |
| --- | --- | --- |
| No security | 163 | 0 |
| ABE without stream-based key management | 177 | 14 |
| ABE with stream-based key management | 163 | <0.3 |

In the example of Table 2, stream-based key management reduced ciphertext expansion overhead by more than ninety-eight percent (98%). Thus, in a publish-subscribe system where the publisher knows which subscriber(s) is/are to receive each packet, stream-based key management allows for strong security while introducing negligible overhead.

III. Detailed Example of Stream-Based Key Management

A detailed example is described below for purposes of clarity. Components and/or operations described below should be understood as examples that may not be applicable to one or more embodiments. Accordingly, components and/or operations described below should not be construed as limiting the scope of one or more embodiments.

Figure 3:
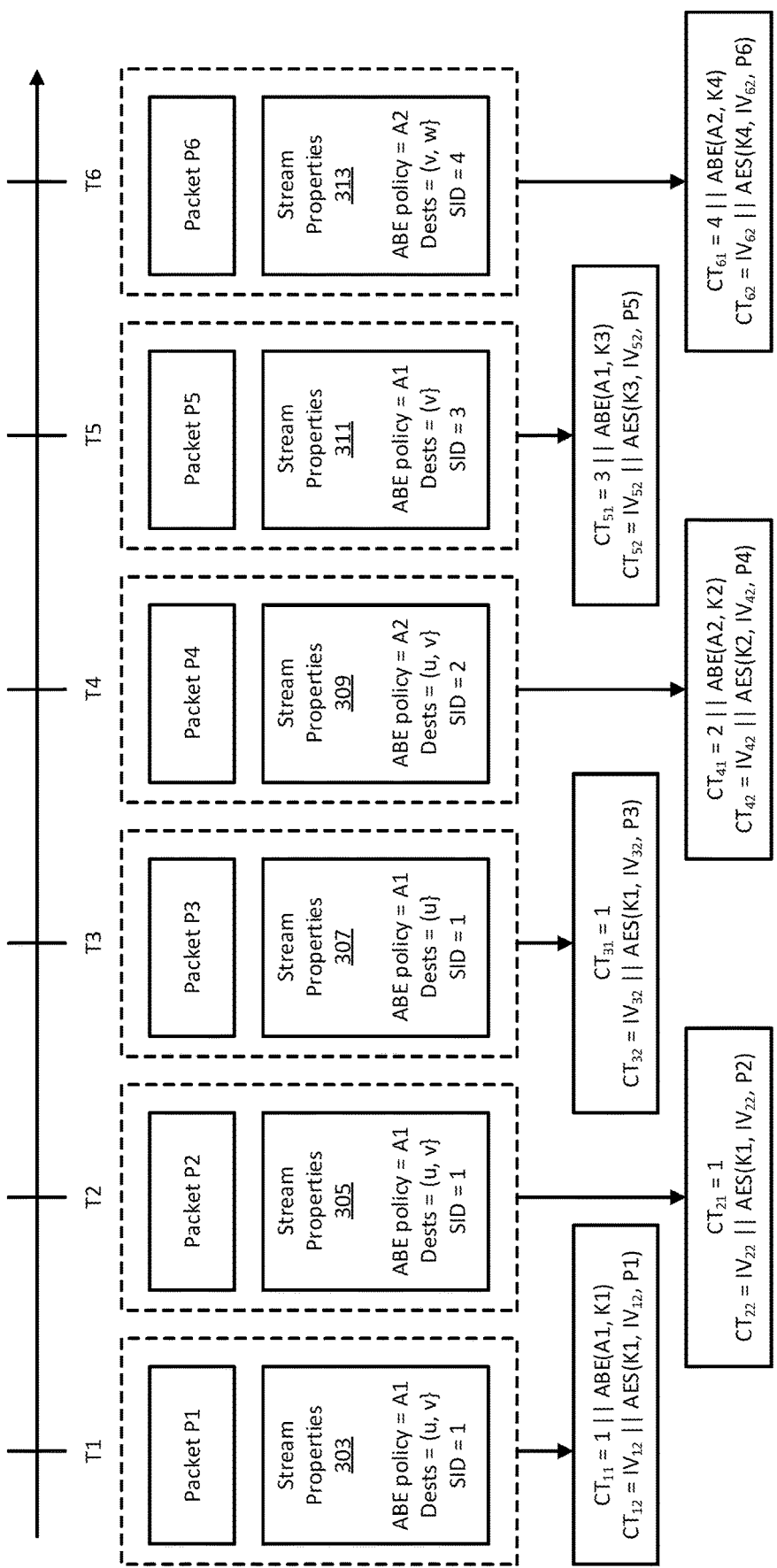
FIG. 3 is a block diagram of an example of stream-based key management according to an embodiment.

FIG. 3 illustrates an example of stream-based key management according to an embodiment. In this example, unless otherwise stated, operations are performed by a publisher in a publish-subscribe interface (e.g., as illustrated in FIG. 1) in which the publisher knows which specific subscriber(s) is/are to receive a given payload. In other examples, one or more operation may be performed by another component. For example, the publisher may offload one or more key management operations to a separate device. In the example illustrated in FIG. 3, a publisher publishes payloads (e.g., packets) to subscribers at various points in time (T1 through T6, proceeding from left to right). In this example, the payloads are individual packets.

At time T1, the publisher obtains a packet P1. Stream properties 303 associated with packet P1 include data that the publisher uses to assign packets to specific streams and/or generate new streams. In this example, packet P1 is associated with ABE Policy A1 and is destined to the set of subscribers {u, v}. The publisher assigns stream identifier (SID) 1 to this set of information. The publisher generates a symmetric key K1 and encrypts the symmetric key K1 based on the ABE policy A1, to obtain a key ciphertext $CT_{11}$. The publisher further encrypts packet P1 using the symmetric key K1 and an initialization vector $IV_{12}$, to obtain a payload ciphertext $CT_{12}$. The publisher publishes the key ciphertext $CT_{11}$ and payload ciphertext $CT_{12}$ to stream 1, to be received by subscribers {u, v}.

At time T2, the publisher obtains another packet P2. The stream properties 305 associated with packet P2 indicate that packet P2 is associated with same ABE Policy A1 as stream 1. Packet P2 also is destined to subscribers that all are in the set of subscribers {u, v} associated with stream 1. Therefore, the publisher can publish packet P2 to stream 1. In addition, between times T1 and T2, the publisher received acknowledgements (not shown) from both of the subscribers {u, v} that they received the key ciphertext $CT_{11}$. Because the publisher knows that the subscribers already have access to the symmetric key K1, the publisher does not need to republish the key ciphertext $CT_{11}$ to the stream. The publisher encrypts packet P2 using the symmetric key K1 and an initialization vector $IV_{22}$, to obtain a payload ciphertext $CT_{22}$. The publisher publishes the payload ciphertext $CT_{22}$ to stream 1, to be received by subscribers {u, v}, without republishing the key ciphertext $CT_{11}$.

At time T3, the publisher obtains another packet P3. The stream properties 307 associated with packet P3 indicate that packet P3 is associated with same ABE Policy A1 and is destined to a subscriber {u} that is in the set of subscribers {u, v} associated with stream 1. Therefore, the publisher can publish packet P3 to stream 1. Again, the publisher does not need to republish the key ciphertext $CT_{11}$ to the stream. The publisher encrypts packet P3 using the symmetric key K1 and an initialization vector $IV_{32}$, to obtain a payload ciphertext $CT_{32}$. The publisher publishes the payload ciphertext $CT_{32}$ to stream 1, to be received by the subscriber {u}, without republishing the key ciphertext $CT_{11}$.

At time T4, the publisher obtains another packet P4. The stream properties 309 associated with packet P4 indicate that packet P4 is associated a different ABE Policy A2 than the ABE Policy A1 associated with stream 1. Therefore, even though the set of target subscribers {u, v} is the same, the publisher cannot publish packet P4 to stream 1. The publisher assigns a new SID 2 to this set of information. The publisher generates a new symmetric key K2 and encrypts the symmetric key K2 based on the ABE policy A2, to obtain a key ciphertext $CT_{41}$. The publisher further encrypts packet P4 using the symmetric key K2 and an initialization vector $IV_{42}$, to obtain a payload ciphertext $CT_{42}$. The publisher publishes the key ciphertext $CT_{41}$ and payload ciphertext $CT_{42}$ to stream 2, to be received by subscribers {u, v}.

At time T5, the publisher obtains another packet P5. At this time, an expiration policy (not shown) indicates that stream 1 has expired, i.e., that time T3 is past the expiration threshold for stream 1. Therefore, even though the stream properties 311 associated with packet P5 indicate that packet P5 associated with same ABE Policy A1 and is destined to a subscriber {v} that is in the set of subscribers {u, v} associated with stream 1, the publisher cannot publish packet P5 to stream 1. The publisher assigns a new SID 3 to this set of information. The publisher generates a new symmetric key K3 and encrypts the symmetric key K3 based on the ABE policy A1, to obtain a key ciphertext $CT_{51}$. The publisher further encrypts packet P5 using the symmetric key K3 and an initialization vector $IV_{52}$, to obtain a payload ciphertext $CT_{52}$. The publisher publishes the key ciphertext $CT_{51}$ and payload ciphertext $CT_{52}$ to stream 3, to be received by the subscriber {v}.

At time T6, the publisher obtains another packet P6. The stream properties 313 associated with packet P6 indicate that packet P6 is associated with the same ABE Policy 2 as stream 2. However, packet P6 is destined to a subscriber {w} not associated with stream 2. Therefore, the publisher cannot publish packet P6 to stream 2. The publisher assigns a new SID 4 to this set of information. The publisher generates a new symmetric key K4 and encrypts the symmetric key K4 based on the ABE policy A2, to obtain a key ciphertext $CT_{61}$. The publisher further encrypts packet P6 using the symmetric key K4 and an initialization vector $IV_{62}$, to obtain a payload ciphertext $CT_{62}$. The publisher publishes the key ciphertext $CT_{61}$ and payload ciphertext $CT_{62}$ to stream 4, to be received by subscribers {v, w}.

In the example illustrated in FIG. 3, the full cost of ciphertext expansion associated with symmetric key K1 was paid once and was not paid again as long as stream 1 was valid. The cost of cyphertext expansion associated with transmitting symmetric keys was thus reduced by approximately one third over the time period T1 through T6.

IV. General; Computer Systems and Networks

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 4:
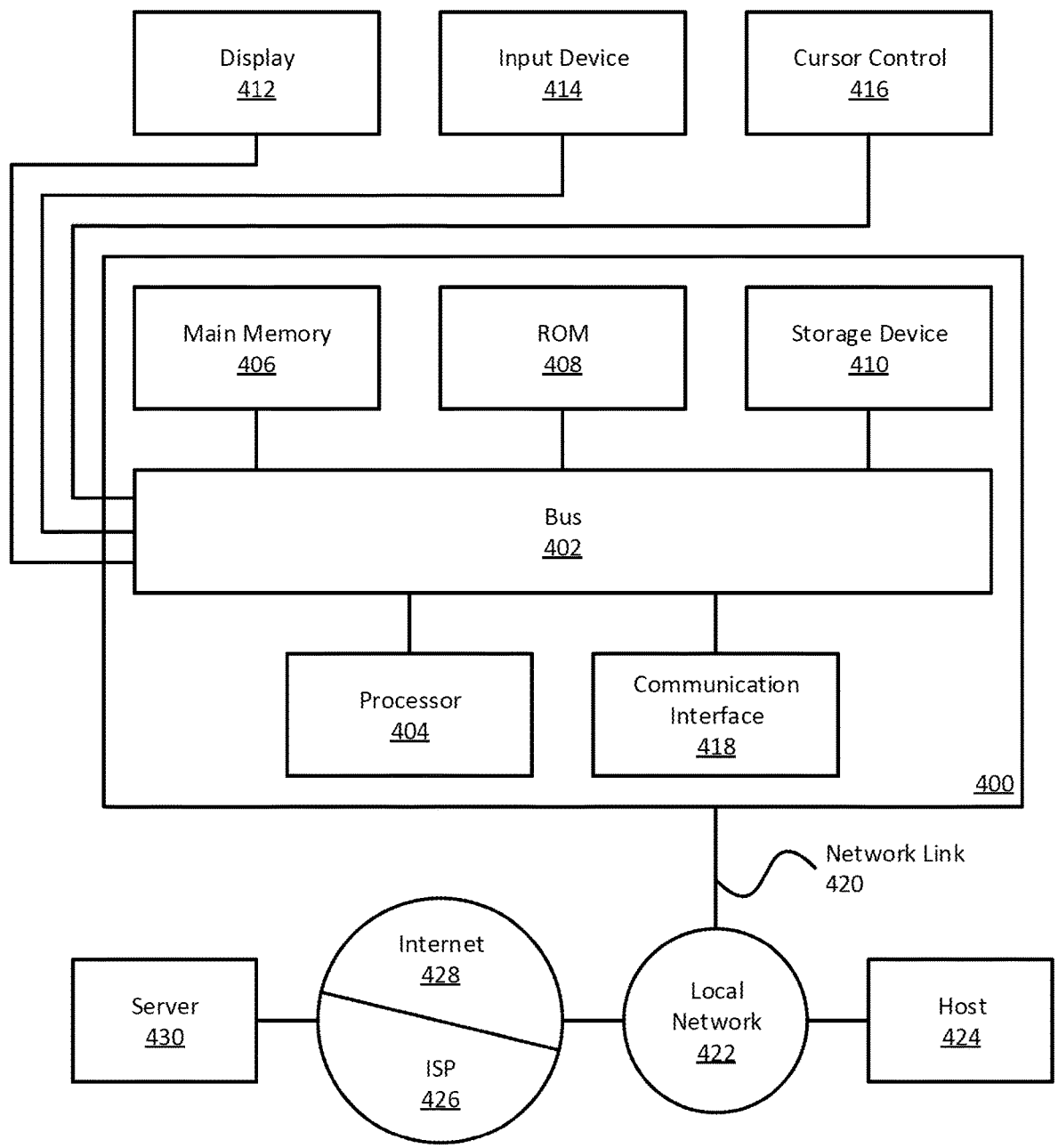
FIG. 4 is a block diagram of an example of a computer system according to an embodiment.

For example, FIG. 4 is a block diagram of an example of a computer system 400 according to an embodiment. Computer system 400 includes a bus 402 or other communication mechanism for communicating information, and a hardware processor 404 coupled with the bus 402 for processing information. Hardware processor 404 may be a general-purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in one or more non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), plasma display, electronic ink display, cathode ray tube (CRT) monitor, or any other kind of device for displaying information to a computer user. An input device 414, including alphanumeric and other keys, may be coupled to bus 402 for communicating information and command selections to processor 404. Alternatively or additionally, computer system 400 may receive user input via a cursor control 416, such as a mouse, a trackball, a trackpad, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. Alternatively or additionally, computer system 4 may include a touchscreen. Display 412 may be configured to receive user input via one or more pressure-sensitive sensors, multi-touch sensors, and/or gesture sensors. Alternatively or additionally, computer system 400 may receive user input via a microphone, video camera, and/or some other kind of user input device (not shown).

Computer system 400 may implement the techniques described herein using customized hard-wired logic, one or more ASICs or FPGAs, firmware, and/or program logic which in combination with other components of computer system 400 causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 402. Transmission media may also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 400 may receive the data from the network and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422, and communication interface 418.

The received code may be executed by processor 404 as it is received, and/or stored in storage device 410, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory machine-readable media storing instructions that, when executed by one or more processors, cause the one or more processors to perform operations comprising:
   obtaining a first payload to be published to a first set of one or more subscribers;
   encrypting the first payload using a first symmetric key, to obtain a first payload ciphertext;
   encrypting the first symmetric key using a first attribute-based encryption (ABE) policy associated with the first payload, to obtain a first key ciphertext;
   publishing the first payload ciphertext and the first key ciphertext to the first set of one or more subscribers;
   obtaining a second payload to be published to a second set of one or more subscribers;
   determining that each subscriber in the second set of one more subscribers is in the first set of one or more subscribers;
   determining that the first ABE policy is associated with the second payload; and
   responsive at least to determining that each subscriber in the second set of one more subscribers is in the first set of one or more subscribers and the first ABE policy is associated with the second payload,
      (a) encrypting the second payload using the first symmetric key, to obtain a second payload ciphertext, and
      (b) publishing the second payload ciphertext to the second set of one or more subscribers, without republishing the first key ciphertext to the second set of one or more subscribers.

2. The one or more non-transitory computer-readable media of claim 1, the operations further comprising:
   receiving one or more acknowledgements that each subscriber in the first set of one or more subscribers received the first key ciphertext,
   publishing the second payload ciphertext to the second set of one or more subscribers, without republishing the first key ciphertext to the second set of one or more subscribers, being further responsive to receiving the one or more acknowledgements that each subscriber in the first set of one or more subscribers received the first key ciphertext.

3. The one or more non-transitory computer-readable media of claim 1, the operations further comprising:
   obtaining a third payload to be published to a third set of one or more subscribers;
   determining that a second ABE policy associated with the third payload is different from the first ABE policy; and
   responsive at least to determining that the second ABE policy associated with the third payload is different from the first ABE policy,
      (a) encrypting the third payload using a second symmetric key that is different from the first symmetric key, to obtain a third payload ciphertext,
      (b) encrypting the second symmetric key using the second ABE policy, to obtain a second key ciphertext, and
      (c) publishing the third payload ciphertext and the second key ciphertext to the third set of one or more subscribers.

4. The one or more non-transitory computer-readable media of claim 1, the operations further comprising:
   obtaining a third payload to be published to a third set of one or more subscribers;
   determining that at least one subscriber in the third set of one more subscribers is not in the first set of one or more subscribers; and
   responsive at least to determining that at least one subscriber in the third set of one more subscribers is not in the first set of one or more subscribers,
      (a) encrypting the third payload using a second symmetric key that is different from the first symmetric key, to obtain a third payload ciphertext,
      (b) encrypting the second symmetric key, to obtain a second key ciphertext, and
      (c) publishing the third payload ciphertext and the second key ciphertext to the third set of one or more subscribers.

5. The one or more non-transitory computer-readable media of claim 4, the operations further comprising:
   after publishing the third payload ciphertext and the second key ciphertext to the third set of one or more subscribers, obtaining a fourth payload to be published to a fourth set of one or more subscribers;
   determining that each subscriber in the fourth set of one more subscribers is in the first set of one or more subscribers;
   determining that the first ABE policy is associated with the fourth payload;
   responsive at least to determining that each subscriber in the fourth set of one more subscribers is in the first set of one or more subscribers and the first ABE policy is associated with the fourth payload, (a) encrypting the fourth payload using the first symmetric key, to obtain a fourth payload ciphertext, and
(b) publishing the fourth payload ciphertext to the fourth set of one or more subscribers, without republishing the first key ciphertext to the fourth set of one or more subscribers;

after publishing the fourth payload ciphertext to the fourth set of one or more subscribers, obtaining a fifth payload to be published to a fifth set of one or more subscribers;

determining that each subscriber in the fifth set of one more subscribers is in the third set of one or more subscribers;

determining that a same ABE policy is associated with the fifth payload and the third payload;

responsive at least to determining that each subscriber in the fifth set of one more subscribers is in the third set of one or more subscribers and a same ABE policy is associated with the fifth payload and the third payload,
(a) encrypting the fifth payload using the second symmetric key, to obtain a fifth payload ciphertext, and
(b) publishing the fifth payload ciphertext to the fifth set of one or more subscribers, without republishing the second key ciphertext to the fifth set of one or more subscribers.

6. The one or more non-transitory computer-readable media of claim 1, the operations further comprising:
obtaining a third payload to be published to a third set of one or more subscribers;
determining that the first symmetric key is no longer valid, based at least on a key expiration policy; and
responsive at least to determining that the first symmetric key is no longer valid,
(a) encrypting the third payload using a second symmetric key that is different from the first symmetric key, to obtain a third payload ciphertext,
(b) encrypting the second symmetric key, to obtain a second key ciphertext, and
(c) publishing the third payload ciphertext and the second key ciphertext to the third set of one or more subscribers.

7. The one or more non-transitory computer-readable media of claim 1, the first set of one or more subscribers having at least one subscriber that is not in the second set of one or more subscribers.

8. A system comprising:
at least one device including a hardware processor;
the system being configured to perform operations comprising:
obtaining a first payload to be published to a first set of one or more subscribers;
encrypting the first payload using a first symmetric key, to obtain a first payload ciphertext;
encrypting the first symmetric key using a first attribute-based encryption (ABE) policy associated with the first payload, to obtain a first key ciphertext;
publishing the first payload ciphertext and the first key ciphertext to the first set of one or more subscribers;
obtaining a second payload to be published to a second set of one or more subscribers;
determining that each subscriber in the second set of one more subscribers is in the first set of one or more subscribers;
determining that the first ABE policy is associated with the second payload; and
responsive at least to determining that each subscriber in the second set of one more subscribers is in the first set of one or more subscribers and the first ABE policy is associated with the second payload,
(a) encrypting the second payload using the first symmetric key, to obtain a second payload ciphertext, and
(b) publishing the second payload ciphertext to the second set of one or more subscribers, without republishing the first key ciphertext to the second set of one or more subscribers.

9. The system of claim 8, the operations further comprising:
receiving one or more acknowledgements that each subscriber in the first set of one or more subscribers received the first key ciphertext,
publishing the second payload ciphertext to the second set of one or more subscribers, without republishing the first key ciphertext to the second set of one or more subscribers, being further responsive to receiving the one or more acknowledgements that each subscriber in the first set of one or more subscribers received the first key ciphertext.

10. The system of claim 8, the operations further comprising:
obtaining a third payload to be published to a third set of one or more subscribers;
determining that a second ABE policy associated with the third payload is different from the first ABE policy; and
responsive at least to determining that the second ABE policy associated with the third payload is different from the first ABE policy,
(a) encrypting the third payload using a second symmetric key that is different from the first symmetric key, to obtain a third payload ciphertext,
(b) encrypting the second symmetric key using the second ABE policy, to obtain a second key ciphertext, and
(c) publishing the third payload ciphertext and the second key ciphertext to the third set of one or more subscribers.

11. The system of claim 8, the operations further comprising:
obtaining a third payload to be published to a third set of one or more subscribers;
determining that at least one subscriber in the third set of one more subscribers is not in the first set of one or more subscribers; and
responsive at least to determining that at least one subscriber in the third set of one more subscribers is not in the first set of one or more subscribers,
(a) encrypting the third payload using a second symmetric key that is different from the first symmetric key, to obtain a third payload ciphertext,
(b) encrypting the second symmetric key, to obtain a second key ciphertext, and
(c) publishing the third payload ciphertext and the second key ciphertext to the third set of one or more subscribers.

12. The system of claim 11, the operations further comprising:
after publishing the third payload ciphertext and the second key ciphertext to the third set of one or more subscribers, obtaining a fourth payload to be published to a fourth set of one or more subscribers;
determining that each subscriber in the fourth set of one more subscribers is in the first set of one or more subscribers;

determining that the first ABE policy is associated with the fourth payload;
responsive at least to determining that each subscriber in the fourth set of one more subscribers is in the first set of one or more subscribers and the first ABE policy is associated with the fourth payload,
  (a) encrypting the fourth payload using the first symmetric key, to obtain a fourth payload ciphertext, and
  (b) publishing the fourth payload ciphertext to the fourth set of one or more subscribers, without republishing the first key ciphertext to the fourth set of one or more subscribers;
after publishing the fourth payload ciphertext to the fourth set of one or more subscribers, obtaining a fifth payload to be published to a fifth set of one or more subscribers;
determining that each subscriber in the fifth set of one more subscribers is in the third set of one or more subscribers;
determining that a same ABE policy is associated with the fifth payload and the third payload;
responsive at least to determining that each subscriber in the fifth set of one more subscribers is in the third set of one or more subscribers and a same ABE policy is associated with the fifth payload and the third payload,
  (a) encrypting the fifth payload using the second symmetric key, to obtain a fifth payload ciphertext, and
  (b) publishing the fifth payload ciphertext to the fifth set of one or more subscribers, without republishing the second key ciphertext to the fifth set of one or more subscribers.

13. The system of claim 8, the operations further comprising:
obtaining a third payload to be published to a third set of one or more subscribers;
determining that the first symmetric key is no longer valid, based at least on a key expiration policy; and
responsive at least to determining that the first symmetric key is no longer valid,
  (a) encrypting the third payload using a second symmetric key that is different from the first symmetric key, to obtain a third payload ciphertext,
  (b) encrypting the second symmetric key, to obtain a second key ciphertext, and
  (c) publishing the third payload ciphertext and the second key ciphertext to the third set of one or more subscribers.

14. The system of claim 8, the first set of one or more subscribers having at least one subscriber that is not in the second set of one or more subscribers.

15. A method comprising:
obtaining a first payload to be published to a first set of one or more subscribers;
encrypting the first payload using a first symmetric key, to obtain a first payload ciphertext;
encrypting the first symmetric key using a first attribute-based encryption (ABE) policy associated with the first payload, to obtain a first key ciphertext;
publishing the first payload ciphertext and the first key ciphertext to the first set of one or more subscribers;
obtaining a second payload to be published to a second set of one or more subscribers;
determining that each subscriber in the second set of one more subscribers is in the first set of one or more subscribers;
determining that the first ABE policy is associated with the second payload; and
responsive at least to determining that each subscriber in the second set of one more subscribers is in the first set of one or more subscribers and the first ABE policy is associated with the second payload,
  (a) encrypting the second payload using the first symmetric key, to obtain a second payload ciphertext, and
  (b) publishing the second payload ciphertext to the second set of one or more subscribers, without republishing the first key ciphertext to the second set of one or more subscribers.

16. The method of claim 15, further comprising:
receiving one or more acknowledgements that each subscriber in the first set of one or more subscribers received the first key ciphertext,
publishing the second payload ciphertext to the second set of one or more subscribers, without republishing the first key ciphertext to the second set of one or more subscribers, being further responsive to receiving the one or more acknowledgements that each subscriber in the first set of one or more subscribers received the first key ciphertext.

17. The method of claim 15, further comprising:
obtaining a third payload to be published to a third set of one or more subscribers;
determining that a second ABE policy associated with the third payload is different from the first ABE policy; and
responsive at least to determining that the second ABE policy associated with the third payload is different from the first ABE policy,
  (a) encrypting the third payload using a second symmetric key that is different from the first symmetric key, to obtain a third payload ciphertext,
  (b) encrypting the second symmetric key using the second ABE policy, to obtain a second key ciphertext, and
  (c) publishing the third payload ciphertext and the second key ciphertext to the third set of one or more subscribers.

18. The method of claim 15, further comprising:
obtaining a third payload to be published to a third set of one or more subscribers;
determining that at least one subscriber in the third set of one more subscribers is not in the first set of one or more subscribers; and
responsive at least to determining that at least one subscriber in the third set of one more subscribers is not in the first set of one or more subscribers,
  (a) encrypting the third payload using a second symmetric key that is different from the first symmetric key, to obtain a third payload ciphertext,
  (b) encrypting the second symmetric key, to obtain a second key ciphertext, and
  (c) publishing the third payload ciphertext and the second key ciphertext to the third set of one or more subscribers.

19. The method of claim 18, comprising:
after publishing the third payload ciphertext and the second key ciphertext to the third set of one or more subscribers, obtaining a fourth payload to be published to a fourth set of one or more subscribers;
determining that each subscriber in the fourth set of one more subscribers is in the first set of one or more subscribers;
determining that the first ABE policy is associated with the fourth payload;

responsive at least to determining that each subscriber in the fourth set of one more subscribers is in the first set of one or more subscribers and the first ABE policy is associated with the fourth payload,
- (a) encrypting the fourth payload using the first symmetric key, to obtain a fourth payload ciphertext, and
- (b) publishing the fourth payload ciphertext to the fourth set of one or more subscribers, without republishing the first key ciphertext to the fourth set of one or more subscribers;

after publishing the fourth payload ciphertext to the fourth set of one or more subscribers, obtaining a fifth payload to be published to a fifth set of one or more subscribers;

determining that each subscriber in the fifth set of one more subscribers is in the third set of one or more subscribers;

determining that a same ABE policy is associated with the fifth payload and the third payload;

responsive at least to determining that each subscriber in the fifth set of one more subscribers is in the third set of one or more subscribers and a same ABE policy is associated with the fifth payload and the third payload,
- (a) encrypting the fifth payload using the second symmetric key, to obtain a fifth payload ciphertext, and
- (b) publishing the fifth payload ciphertext to the fifth set of one or more subscribers, without republishing the second key ciphertext to the fifth set of one or more subscribers.

20. The method of claim 15, further comprising:

obtaining a third payload to be published to a third set of one or more subscribers;

determining that the first symmetric key is no longer valid, based at least on a key expiration policy; and responsive at least to determining that the first symmetric key is no longer valid,
- (a) encrypting the third payload using a second symmetric key that is different from the first symmetric key, to obtain a third payload ciphertext,
- (b) encrypting the second symmetric key, to obtain a second key ciphertext, and
- (c) publishing the third payload ciphertext and the second key ciphertext to the third set of one or more subscribers.

\* \* \* \* \*